No. 625,523. Patented May 23, 1899.
P. C. TOTMAN.
STRAINER ATTACHMENT FOR KETTLES, &c.
(Application filed Nov. 21, 1898.)
(No Model.)
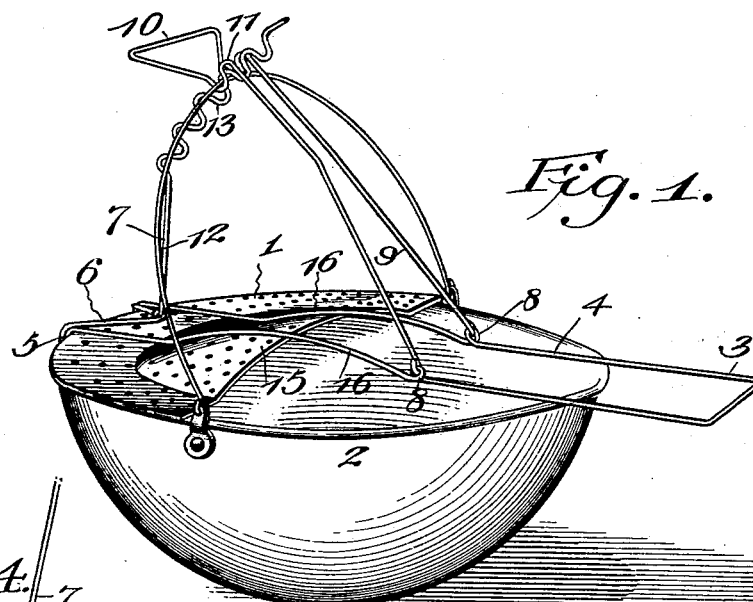
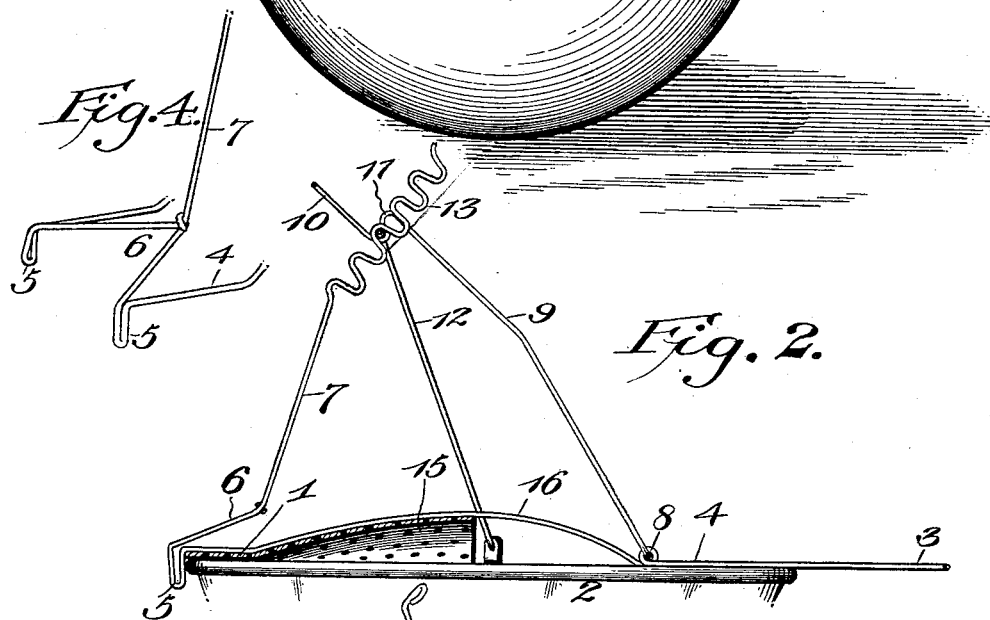
Witnesses  Perry C. Totman, Inventor.
By his Attorneys.

UNITED STATES PATENT OFFICE.

PERRY C. TOTMAN, OF CASSADAGA, NEW YORK.

STRAINER ATTACHMENT FOR KETTLES, &c.

SPECIFICATION forming part of Letters Patent No. 625,523, dated May 23, 1899.

Application filed November 21, 1898. Serial No. 697,066. (No model.)

*To all whom it may concern:*

Be it known that I, PERRY C. TOTMAN, a citizen of the United States, residing at Cassadaga, in the county of Chautauqua and State of New York, have invented a new and useful Strainer Attachment for Kettles, &c., of which the following is a specification.

The invention relates to improvements in strainer attachments for kettles and the like.

The object of the present invention is to improve the construction of strainer attachments for kettles and other culinary utensils and to provide a simple, inexpensive, and efficient device capable of being readily adjusted to a receptacle and adapted to be readily handled for tilting the same to enable the liquid contents to be poured off without burning the operator or losing any of the solid contents.

The invention consists in the construction and novel combination and arrangement of parts, as hereinafter fully described, illustrated in the accompanying drawings, and pointed out in the claims hereto appended.

In the drawings, Figure 1 is a perspective view of a strainer attachment constructed in accordance with this invention and shown applied to a kettle. Fig. 2 is a longitudinal sectional view of the same. Fig. 3 is a perspective view of the device detached. Fig. 4 is a detail view of one end of the frame.

Like numerals of reference designate corresponding parts in all the figures of the drawings.

1 designates a segmental strainer arranged to cover substantially one-half of a pot or kettle 2 and extending from the center thereof at one side of the bail to the adjacent periphery, whereby the pot or receptacle may be tilted for straining off the liquid contents without liability of losing any of the substance cooked. The strainer is secured to one end of an oblong frame 4, constructed of wire or other suitable material and extending across the pot or kettle and projecting beyond the same to form a handle 3, which is adapted to be grasped by the operator when tilting the pot or kettle. The handle is located at one end of the frame, and the other end of the same, which is soldered or otherwise secured to the upper face of the strainer, is provided with depending hooks 5, formed by bending the terminals of the sides downward, as shown. The wire of which the frame is constructed is extended upward over the strainer after forming the hooks to provide a substantially V-shaped support 6, and one side of the support is extended to form a spring 7, for a purpose hereinafter described.

The sides of the frame are provided at points between the strainer and the handle with eyes 8, into which are linked corresponding eyes of a hinged brace 9, provided at its upper end with a handle 10 and having a double U-shaped bend 11 adjacent to the handle to form a hook for engaging the bail 12 of the pot or kettle 1.

In applying the strainer attachment to the pot or kettle the bail 12 is placed in the hook of the brace, which is swung upward, and the bail is locked in the said hook by the spring 7. The brace, which is constructed of a single piece of wire, is composed of two sides having parallel upper portions and diverging lower portions, and the handle at the upper or outer end of the brace is substantially triangular, as shown.

The spring 7, which is formed integral with the frame, extends upward therefrom and is arranged between the sides of the brace, and its upper portion is provided with a series of bends 13, forming recesses adapted to engage the bail. By this construction the device is adjustable to bails of different heights, and the spring has sufficient resiliency to hold the bail in the bend of the brace.

The strainer 1 is provided with a flat peripheral portion to rest upon the upper edge of the pot or kettle, and the inner portion 15 is arched or bowed upward, and the central portions of the sides of the frame are curved to correspond to the shape of the strainer. The sides of the frame are coiled to form the eyes 8, which are located at the inner terminals of the curved portions 16.

The invention has the following advantages: The strainer attachment for pots and kettles is simple, inexpensive, strong, and durable. It is adapted to be readily applied to various receptacles having bails, and it is capable of enabling the same to be readily handled and tilted for pouring off their liquid contents without burning the operator or losing any of the vegetables, meats, or other substances being cooked. The notches or recesses formed by the bends at the upper end of the spring enable the device to be readily adjusted to bails of different heights.

Changes in the form, proportion, and minor details of construction may be resorted to without departing from the spirit or sacrificing any of the advantages of this invention.

What is claimed is—

1. A device of the class described comprising a frame adapted to engage a receptacle, a brace hinged to the frame and arranged to engage the bail of the receptacle, and a spring extending from the frame and holding the bail in engagement with the brace, substantially as described.

2. A device of the class described comprising a frame adapted to engage a receptacle and provided at one end with a handle, a brace hinged to the frame, adapted to engage the bail of the receptacle and provided with a handle, and a spring extending from the frame and retaining the bail in engagement with the brace, substantially as described.

3. A device of the class described comprising a frame adapted to engage a receptacle and provided with a handle, a brace connected with the frame and arranged to engage the bail of the receptacle, a spring extending from the frame and holding the bail in engagement with the brace, and a strainer carried by the frame, substantially as described.

4. A device of the class described comprising an oblong frame designed to extend across the top of a receptacle, provided at one end with hooks and having a handle at its other end, the sides of the frame adjacent to the hook being extended inward and connected to form a support, a strainer mounted on the frame, a brace adapted to engage the bail of the receptacle and connected with the frame, and a spring extending upward from the support at an angle to the brace and holding the bail in engagement with the latter, substantially as described.

5. A device of the class described comprising a frame adapted to engage a receptacle, a brace connected with the frame and arranged to engage the bail of the receptacle, and a spring arranged at an angle to the brace and connected with the frame and provided with a series of bends forming recesses, adapted to engage the bail to hold the same in engagement with the brace, substantially as described.

6. A device of the class described comprising a frame, a brace composed of two sides and provided at its upper end with a handle and having a double bend adjacent to the same to receive the bail of the receptacle, and a spring extending from the frame between the sides of the brace at an angle to the latter and holding the bail in engagement with the bend of the same, substantially as described.

In testimony that I claim the foregoing as my own I have hereto affixed my signature in the presence of two witnesses.

PERRY C. TOTMAN.

Witnesses:
  W. B. WAIT,
  GEO. W. STAN.